March 25, 1969   R. M. JACKMAN   3,434,745
PIPE COUPLING HAVING A SPLIT RING LOCKING MEANS
Filed April 13, 1967
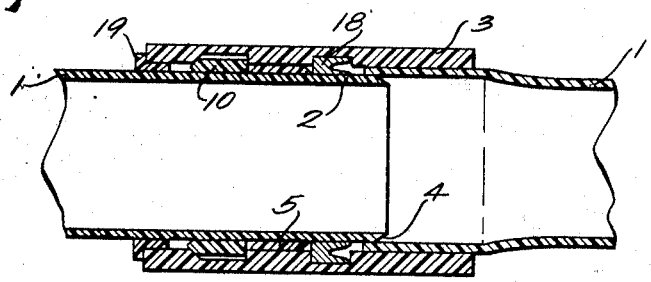
Fig. 1
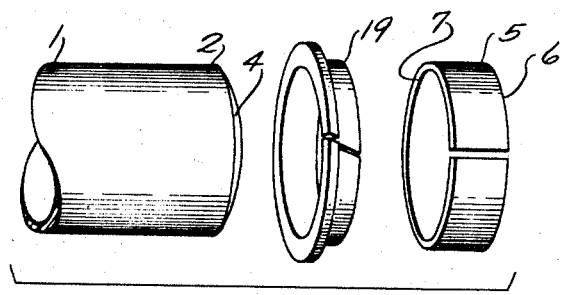
Fig. 2
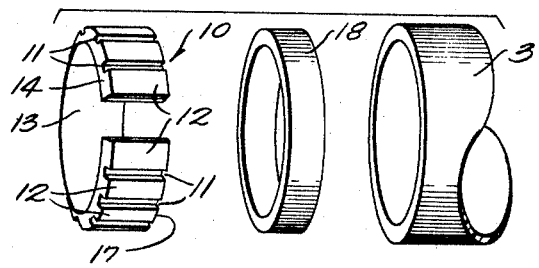
Fig. 3
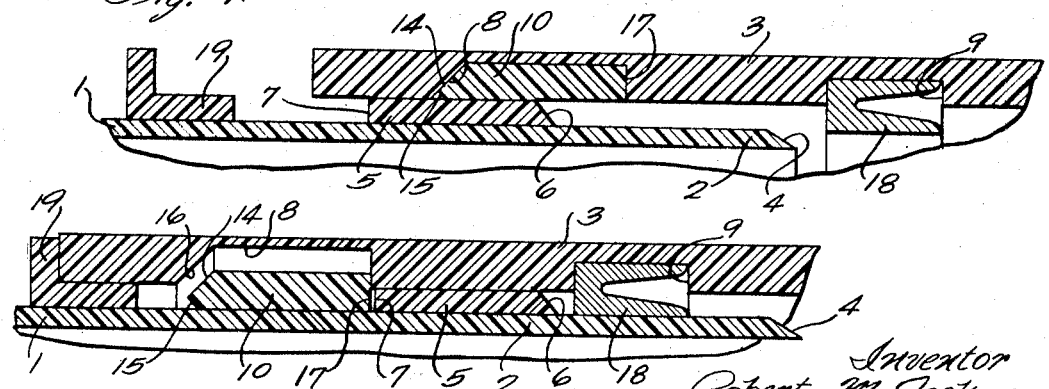
Fig. 4
Fig. 5
Inventor
Robert M. Jackman
By Andrus & Starke
Attorneys

United States Patent Office 3,434,745
Patented Mar. 25, 1969

3,434,745
PIPE COUPLING HAVING A SPLIT RING LOCKING MEANS
Robert M. Jackman, Little Rock, Ark., assignor to A. O. Smith Corporation, Milwaukee, Wis., a corporation of New York
Filed Apr. 13, 1967, Ser. No. 630,631
Int. Cl. F16l *21/04, 21/06*
U.S. Cl. 285—111 7 Claims

ABSTRACT OF THE DISCLOSURE

A coupling for pipe sections, and particularly, bell and spigot type pipe sections. The outer surface of the spigot end of the pipe section is provided with a circumferential ridge or land, and the leading end of the land, facing the end of the pipe section, is tapered inwardly. The bell end of the other pipe section is provided with an internal groove which receives an expandable split ring. The outer surface of the ring is provided with a series of longitudinally extending slots dividing the outer surface into a series of segments having tapered or wedge shaped leading ends. When the spigot end of one pipe section is inserted within the bell end of the other pipe section, the land serves to expand the split ring and passes beyond the trailing end of the ring to provide a firm connection between the two pipe sections.

---

Fiber glass reinforced plastic pipe sections can be joined together by auxiliary couplings or by the use of bell and spigot type joints in which the spigot end of one pipe section is inserted and locked within the bell end of the other pipe section. The invention relates to an improved mechanical locking coupling for joining bell and spigot type plastic pipe sections. According to the invention, a ring is bonded to the outer surface of the spigot end of the pipe section to provide a land or ridge and the leading end of the land facing the end of the pipe is tapered. Located in the inner surface of the bell end is an annular recess which receives an expanded split ring. The outer surface of the ring is provided with a series of longitudinal grooves or slots which divide the ring into a series of circumferentially spaced segments. The internal diameter of the leading end of the ring is tapered and when the spigot end of one pipe section is inserted within the bell end of the other pipe section, the tapered end of the land engages the tapered leading end of the split ring to expand the ring and permit the land to pass beyond the ring. Both the land and the expandable ring have trailing end surfaces which are generally normal to the axis of the pipe sections and after the land passes beyond the ring, the end surfaces engage each other and prevent uncoupling of the pipe sections.

As an added feature, the recess which receives the expandable ring has a tapered surface to compliment a taper on the outer diameter of the leading end of the ring. When the coupled pipe sections are subjected to tensile stress, a wedging action occurs between the two tapered surfaces to wedge the ring radially inward and increase the sealing effect between the ring and the land.

The segmental outer surface of the split, expandable ring provides flexibility and enables the ring to readily expand and contract in diameter and yet the annular base section of the ring which connects the segments together provides sufficient strength to enable the unit to perform under high pressure loading. The shear strength of the expandable ring is determined by the entire thickness of the ring, including the segments and the connecting annular section. The individual segments do not, however, add stiffness to the ring, for the flexibility of the ring, or its ability to readily expand and contract, is determined by the thickness of the annular connecting base section. Thus, the expandable, segmental ring of the invention provides excellent shear strength due to its overall thickness and yet can be readily flexed in a radial dimension. A solid split ring of the same overall thickness would have similar shear strength but would be difficult to compress for initial assembly into the recess and would be too stiff to spring back and allow passage of the locking land.

Other objects and advantages will appear in the course of the following description.

The drawings illustrate the best mode presently contemplated of carrying out the invention.

In the drawings:

FIG. 1 is a longitudinal section of a pair of pipe sections utilizing the coupling of the invention;

FIG. 2 is an exploded view of the spigot end of the pipe section;

FIG. 3 is an exploded view of the bell end of the pipe section;

FIG. 4 is an enlarged longitudinal section, showing the spigot end of one pipe section being inserted into the bell end of the other section; and FIG. 5 is a view similar to FIG. 4 showing the coupling in the locked and sealed position.

The drawings illustrate a pair of pipe sections 1 formed of metal, plastic, asbestos, or other materials. One of the pipe sections is provided with a spigot end 2 which is adapted to be inserted within an enlarged bell end 3 of the other pipe section. To facilitate the insertion of the spigot end 2 within the bell end 3, the spigot end is chamferred, as indicated at 4.

The spigot end 2 is provided with an external land or ridge 5 and the leading end of the land, facing the adjacent end of the pipe section, is tapered as indicated by 6. The opposite or trailing end 7 of the land 5 is generally normal to the axis of the pipe section 1.

The bell end 3 of the pipe section 1 is provided with a pair of circumferentially extending grooves 8 and 9. Groove 8 is spaced from the end of the pipe section and is adapted to receive an expandable split ring 10. As best shown in FIG. 3, the outer surface of split ring 10 is provided with a series of longitudinal slots or grooves 11 which divide the outer periphery of the ring into a series of individual segments 12 which are connected together by the annular base section 13.

The leading end of the ring 10 is provided with a pair of tapered surfaces 14 and 15 which are located on the outer diameter and inner diameter respectively. The tapered surface 14 is adapted to engage and complement a tapered surface 16 of the groove 8 in the pipe section.

The trailing end 17 of the ring 10 is disposed generally normal to the axis of the pipe section and in the locked position is disposed in engagement with the trailing end 7 of the land 5 to provide a locking connection between the two pipe sections.

The joint between the pipe sections is sealed by a sealing ring 18 which is generally U-shaped in cross section and is located within the groove 9 formed in the bell end 3. The seal 18 is of conventional construction and internal pressure within the pipe section will act on the flanges of the sealing ring 18 to urge the flanges into tight bearing engagement with the two pipe sections. With this type of a seal an increase in the internal pressure will result in a corresponding increase in the sealing pressure between the two members.

In addition to sealing ring 18, a second seal ring 19 is located between the outer end of the bell end 3 and the spigot end 2. The seal 19 is generally L-shaped in cross section and is driven between the two members after the two pipe sections have been coupled. The seal 19 not only prevents foreign material from entering the joint between the pipe sections, but also serves to center the spigot section 3 with respect to the bell section 2 and maintain proper alignment of the coupling elements.

To assemble the coupling of the invention, the spigot end 2 is initially cleaned and smoothed by sanding or the like, and the chamfered end 4 is machined. The land 5 is then bonded to the outer surface of the spigot end by a suitable adhesive.

The split ring 10 and the sealing ring 18 are then installed within the grooves 8 and 9 in the bell end 3, and the spigot end is inserted within the bell end. As the spigot end is inserted, the tapered end 6 of land 5 engages the tapered edge 15 of the ring 10 to expand the ring radially outward and enable the land to pass beyond the ring, as shown in FIG. 4. After the land has moved inwardly beyond the ring 10 the ring springs back to a relatively compressed condition so that the rear end 17 of the ring 10 is in engagement with the rear end 27 of the land 5 to provide a positive lock between the two members.

The sealing ring 19 is then inserted between the end of the bell end 3 and the spigot end 2 to provide a seal between the members and to center the spigot end within the bell end.

Disengagement of the coupled pipe sections can be accomplished by the insertion of a tool in the space between the bell end 3 and spigot end 2 after removal of sealing ring 19. The tool has two semi-circular segments of a thickness slightly greater than the thickness of land 5. The segments of the tool have a taper on the leading edge which acts to expand the ring 10 in the same manner as land 5 expands the ring when the pipe sections are initially inserted together. With the ring 10 expanded by the tool, the spigot end 2 and the tool can then be withdrawn from the bell end 3.

The present invention provides an improved sealing and locking mechanism for joining bell and spigot type pipe sections. The shear strength of the coupling is determined by the overall thickness of the split ring 10, and the slots 11 do not reduce the shear strength, for the shear strength of the ring is substantially the same as the shear strength of a non-segmented ring of the same thickness. The segments, however, provide increased flexibility with respect to a non-segmented ring of the same overall thickness for the flexibility is determined by the thickness of the annular connecting section 13 and not by the thickness of the segments 12. Thus, the ring 10 overcomes the inherent disadvantage of the conventional snap rings having circular or square cross sections and which either provide too little cross sectional area for the required shear strength or, if adequate in cross sectional area, are too rigid to manipulate.

If the coupled pipe sections are subjected to a tensile stress, the tapered surface 14 of ring 10 wedges against the tapered surface 16 of groove 8, and the wedging action forces the ring 10 radially inward to increase the sealing effect.

The coupling can be easily assembled and is automatically locked and sealed by merely inserting the spigot end into the bell end. While the coupling is particularly adaptable for joining fiber reinforced plastic pipe sections, it is contemplated that the coupling can be used for joining any type of tubular members. Moreover, the ring 10 does not necessarily have to be an integral unit formed from a single material, but instead, individual segments 12 of metal, plastic or the like can be bonded, fused or mechanically attached to a flexible base section 13.

While the above description was directed to the coupling as applied to bell and spigot pipe sections, it is contemplated that the invention may also be applied to a separate coupling utilized to join the ends of two pipe sections. In this case, each end of the coupling is provided with an internal groove and an expandable split ring, and as a pipe section is inserted within the end of the coupling, a land formed on the leading end of the pipe section expands the corresponding split ring and locks in behind the ring in the manner previously described.

I claim:

1. A coupling construction for a tubular member comprising a first tubular member, a second tubular member to be received within said first tubular member, a projection fixed on the outer surface of said second tubular member and extending circumferentially of said second tubular member and spaced from the outer extremity thereof, the inner surface of said first tubular member being provided with a circumferentially extending recess spaced from the outer extremity of said first tubular member, and a longitudinally split ring disposed within said recess, the outer surface of said ring having at least one longitudinal groove extending partially through the thickness of said ring to divide the outer surface of said ring into a series of segments and the inner surface of said ring being continuous throughout the circumferential extent of the ring and being free of grooves, the radial thickness of said ring being greater than the radial distance between the inner surface of the first tubular member and the outer surface of the second tubular member, the trailing ends of both the projection and the ring extending generally normal to the axis of the respective tubular member, the leading end of said ring facing the outer extremity of said first tubular member being tapered and arranged to engage the leading end of the projection when the second tubular member is inserted within the first tubular member to thereby expand the ring radially and permit the ring to pass longitudinally inward beyond the projection to a locking position wherein the trailing end of the ring engages the trailing end of the projection, the internal diameter of the ring in its relaxed condition being substantially equal to the outer diameter of the second tubular member.

2. The coupling construction of claim 1, wherein the projection is a circumferential ridge.

3. The coupling construction of claim 1, wherein the leading end of the projection is tapered and is arranged to engage the tapered leading end of the ring to thereby expand the ring by a wedging action.

4. The coupling construction of claim 1, and including a sealing ring positioned adjacent the outer extremity of said first tubular member and disposed between the inner surface of the first tubular member and the outer surface of said second tubular member.

5. The coupling construction of claim 4 wherein the sealing ring has a generally L-shape in cross section and includes a longitudinal flange and a radial flange, said longitudinal flange being disposed between the tubular members and said radial flange abutting against the outer extremity of said first tubular member.

6. The couplng construction of claim 4, and including a second sealing ring positioned adjacent the outer extremity of the second tubular member and disposed between the outer surface of the second tubular member and the inner surface of the first tubular member.

7. A coupling construction for tubular members, comprising a first tubular member having a bell end, a second tubular member having a spigot end to be received within said bell end, a circumferential land fixed on the outer surface of said spigot end and spaced from the outer extremity of said spigot end, the leading end of said land facing the outer extremity of said spigot end being tapered, the inner surface of said bell end being provided with a circumferentially extending recess spaced from the outer extremity of said bell end, the leading end of said recess facing the outer extremity of said bell end being tapered, and a longitudinally split ring disposed within said recess, the outer surface of said ring having at least one longitudinal groove extending partially through the thickness of said ring to divide the outer surface of said ring into a series of segments and the inner surface of said ring being continuous throughout the circumferential extent of the ring, the radial thickness of said ring being greater than the radial distance between the inner surface of said bell end and the outer surface of said spigot end, the trailing ends of both the land and the ring extending generally normal to the axis of the respective tubular member, the outer portion of the leading end of said ring facing the outer extremity of said bell end being tapered and arranged to engage the tapered leading end of said recess, the inner portion of the leading end of said ring being tapered in the opposite direction of the taper on the outer portion of the leading end of the ring to provide the leading end of said ring with a generally chisel-shape, the taper on the inner portion of the leading end of the ring arranged to engage the tapered leading end of said land when the spigot end is inserted within the bell end to thereby expand the ring radially and permit the ring to pass longitudinally inward beyond the land to a locking position wherein the trailing end of the ring engages the trailing end of the land, the internal diameter of said ring in its relaxed condition being substantially equal to the outer diameter of the spigot end.

References Cited

UNITED STATES PATENTS 3,353,563   11/1967   Hutton _____ 285—374 X

FOREIGN PATENTS 1,305,096   8/1962   France.
1,310,712   10/1962   France.
  932,001   7/1963   Great Britain.
 6412254   5/1965   Netherlands.

THOMAS F. CALLAGHAN, *Primary Examiner.*

U.S. Cl. X.R.

285—315, 321, 351, 423